United States Patent
Leblans et al.

Patent Number: 5,853,946
Date of Patent: Dec. 29, 1998

[54] PHOTOSTIMULABLE PHOSPHOR

[75] Inventors: Paul Leblans, Kontich; Paul Lardon, Wijnegem, both of Belgium

[73] Assignee: Agfa-Gevaert, N.V., Mortsel, Belgium

[21] Appl. No.: 932,584

[22] Filed: Sep. 17, 1997

[30] Foreign Application Priority Data

Oct. 10, 1996 [EP] European Pat. Off. .............. 96202816

[51] Int. Cl.⁶ .................................................. G03C 5/17
[52] U.S. Cl. .......................................... 430/139; 430/967
[58] Field of Search ..................................... 430/139, 967

[56] References Cited

U.S. PATENT DOCUMENTS 5,624,603  4/1997  Leblans et al. .......................... 430/139

FOREIGN PATENT DOCUMENTS

| | | |
|---|---|---|
| 0 142 734 A1 | 5/1985 | European Pat. Off. . |
| 0 345 903 A2 | 12/1989 | European Pat. Off. . |
| 0 345 903 A3 | 12/1989 | European Pat. Off. . |
| 0 345 904 A2 | 12/1989 | European Pat. Off. . |
| 0 345 904 A3 | 12/1989 | European Pat. Off. . |
| 0 345 905 A2 | 12/1989 | European Pat. Off. . |
| 0 345 905 A3 | 12/1989 | European Pat. Off. . |
| 0 533 233 A1 | 3/1993 | European Pat. Off. . |
| 0 533 234 A1 | 3/1993 | European Pat. Off. . |

*Primary Examiner*—Hoa Van Le
*Attorney, Agent, or Firm*—Breiner & Breiner

[57] ABSTRACT

There is provided a photostimulable phosphor according to formula (I):

$$Ba_{1-x-y-p-3q-z}Sr_xM_y^{2+}M_{2p}^{1+}M_{2q}^{3+}F_{2-a-b}Br_aI_b:zEu$$

wherein:

$M^{1+}$ is at least one alkali metal selected from the group consisting of Li, Na, K, Rb and Cs;

$M^{2+}$ is at least one metal selected from the group consisting of Ca Mg and Pb;

$M^{3+}$ is at least one metal selected from the group consisting of Al, Ga, In, Tl, Sb, Bi, Y, La, Ce, Pr, Nd, Sm, Gd, Tb, Dy, Ho, Er, Tm, Yb and Lu;

$0 \leq x \leq 0.30$, $0 \leq y \leq 0.10$, $0 \leq p \leq 0.3$, $0 \leq q \leq 0.1$, $0.05 \leq a \leq 0.76$, $0.20 \leq b \leq 0.90$, $a+b<1.00$ and $10^{-6} \leq z \leq 0.2$.

4 Claims, 2 Drawing Sheets

PHOTOSTIMULABLE PHOSPHOR

FIELD OF THE INVENTION

The present invention relates to a storage phosphor which emits fluorescent light on photostimulation after being exposed to penetrating radiation.

BACKGROUND OF THE INVENTION

In radiography the interior of objects is reproduced by means of penetrating radiation, which is high energy radiation also known as ionising radiation belonging to the class of X-rays, gamma-rays and high-energy elementary particle radiation, e.g. beta-rays, electron beam or neutron radiation. For the conversion of penetrating radiation into visible light and/or ultraviolet radiation luminescent substances, called phosphors, are used.

In a conventional radiographic system an X-ray radiograph is obtained by X-rays transmitted image-wise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

In practice the light emitted image-wise by said screen irradiates a contacting photographic silver halide emulsion layer film which after exposure is developed to form therein a silver image in conformity with the X-ray image.

More recently as described e.g. in U.S. Pat. No. 3,859,527 an X-ray recording system has been developed wherein photostimulable storage phosphors are used having in addition to their immediate light emission (prompt emission) on X-ray irradiation the property to store temporarily a large part of the X-ray energy. Said energy is set free by photostimulation in the form of fluorescent light different in wavelength from the light used in the photostimulation. In said X-ray recording system the light emitted on photostimulation is detected photoelectronically and transformed into sequential electrical signals.

The basic constituents of such X-ray imaging system operating with a photostimulable storage phosphor are an imaging sensor containing said phosphor in particulate form normally in a plate or panel, which temporarily stores the X-ray energy pattern, a scanning laser beam for photostimulation, a photoelectronic light detector providing analogue signals that are converted subsequently into digital time-series signals, normally a digital image processor which manipulates the image digitally, a signal recorder, e.g. magnetic disk or tape, and an image recorder for modulated light exposure of a photographic film or an electronic signal display unit, e.g. cathode-ray tube. A survey of lasers useful in the read-out of photostimulable latent fluorescent images is given in the periodical Research Disclosure December 1989, item 308117.

Of special interest in the application of said image recording and reproducing method are particular barium fluorohalide phosphors identified in U.S. Pat. No. 4,239,968.

According to U.S. Pat. No. 4,239,968 a method is claimed for recording and reproducing a radiation image comprising the steps of (i) causing a visible ray- or infrared ray-stimulable phosphor to absorb a radiation passing through an object, (ii) stimulating said phosphor with stimulation rays selected from visible rays and infrared rays to release the energy of the radiation stored therein as fluorescent light, characterised in that said phosphor is at least one phosphor selected from the group of alkaline earth metal fluorohalide phosphors represented by the formula:

$$(Ba_{1-x}M_x^{II})FX:yA$$

wherein:

$M^{II}$ is one or more of Mg, Ca, Sr, Zn and Cd;

X is one or more of Br, Cl or I;

A is at least one member of the group consisting of Eu, Tb, Ce, Tm, Dy, Pr, Ho, Nd, Yb and Er; and x is in the range $0 \leq x \leq 0.6$ and y is in the range $0 \leq y \leq 0.2$, and that the wavelength of said stimulating rays is not less than 500 nm. In said US patent a graph shows the relationship between the wavelength of the stimulation rays and the luminance of the stimulated light, i.e. the stimulation spectrum from which can be learned that said kind of phosphor has high photostimulation sensitivity to stimulation light of a He—Ne laser beam (633 nm) but poor photostimulability below 500 nm. The stimulated light (fluorescent light) is situated in the wavelength range of 350 to 450 nm with a peak at about 390 nm (ref. the periodical Radiology, September 1983, p.834.).

In radiography, as in any imaging method, the signal-to-noise ratio of the recorded image should be as high as possible.

Although $BaFBr:Eu^{2+}$ storage phosphors, used in digital radiography, have a relatively high X-ray absorption in the range from 30–120 keV, which is relevant for general medical radiography, the absorption is lower than the X-ray absorption of most prompt-emitting phosphors used in screen/film radiography, like e.g. $LaOBr:Tm$, $Gd_2O_2S:Tb$ and $YTaO_4:Nb$. Therefore, $LaOBr:Tm$, $Gd_2O_2S:Tb$ or $YTaO_4:Nb$ screens will absorb a larger fraction of the irradiated X-ray quanta than $BaFBr:Eu$ screens of equal thickness. The signal to noise ratio (SNR) of an X-ray image being proportional to the square-root of the absorbed X-ray dose, the images made with $LaOBr:Tm$, $Gd_2O_2S:Tb$ or $YTaO_4:Nb$ screens will be less noisy than images made with $BaFBr:Eu$ screens having the same thickness. A larger fraction of X-ray quanta will be absorbed when thicker $BaFBr:Eu$ screens are used. Use of thicker screens, however, leads to diffusion of light over larger distances in the screen, which causes deterioration of image resolution. For this reason, X-ray images made with digital radiography, using BaFBr screens, as disclosed in U.S. Pat. No. 4,239,968, give a more noisy impression than images made with screen/film radiography.

A more appropriate way to increase the X-ray absorption of phosphor screens is by increasing the intrinsic absorption of the phosphor. In BaFBr:Eu storage phosphors this can be achieved by partly substituting bromine by iodine.

BaFX:Eu phosphors containing large amounts of iodine have been described e.g. in EP-A 142 734, the general formula of said phosphor is $BaF(Br_{1-x}I_x):yEu$, and $10^{-3} \leq x < 1.0$. In FIG. 3 of said patent, the relative luminance of BaFX:Eu storage phosphors is shown as a function of the iodine content. It is clear from said FIG. 3 of the disclosure mentioned above, that, although x can be as great as 1.0 according to the general formula, the portion of Br that is replaced by I should preferably not be made higher than 50% since replacement of a larger portion of Br by I, leads to a lower relative luminance, of the light emitted upon stimulation. The relative luminance of the storage phosphor should be as high as possible, since the sensitivity of a storage phosphor system is proportional to the storage phosphor luminance and apart from a high X-ray absorption, a high system sensitivity is essential for reducing image noise. Therefore, in a phosphor as disclosed in EP-A 142 734, the gain in image quality, due to the higher absorption of X-rays when more than 50% of iodine is included in the phosphor is offset by the lowering of the relative luminance.

In EP-A 533 236 a divalent europium activated stimulable phosphor is claimed wherein the stimulated light has a higher intensity when the stimulation proceeds with light of 550 nm, than when the stimulation proceeds with light of 600 nm. It is said that in said phosphor a "minor part" of bromine is replaced by chlorine and/or iodine. By minor part has to be understood less than 50atom %.

In digital radiography it can be advantageous to use photostimulable phosphors that can very effectively be stimulated by light with wavelength higher than 600 nm, since then the choice of small reliable lasers that can be used for stimulation (e.g. He—Ne, semi-conductor lasers, solid state lasers, etc) is very great so that the laser type does not dictate the dimensions of the apparatus for reading (stimulating) the stimulable phosphor screen. In EP-A 704 511 a radiation image recording and reproducing method is disclosed comprising the steps of:

i. causing a radiation image storage panel containing a photostimulable phosphor to absorb radiation having passed through an object or having been radiated from an object, ii. exposing said image storage panel to stimulating rays to release the radiation energy stored therein as light emission, the stimulating rays being electromagnetic waves having a wavelength within the range of 700–900 nm iii. detecting the emitted light, characterised in that said photostimulable phosphor corresponds to the general formula:

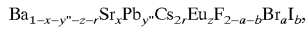

wherein $0 \leq x \leq 0.30$, $10^{-4} < y'' < 10^{-3}$, $10^{-7} < z < 0.15$, $0 \leq r < 0.05$, $0.75 \leq a+b \leq 1.00$, $0.05 < b < 0.20$.

The signal-to-noise ratio achieved in radiographic images produced by the method of EP-A 704 511 leaves however still room for improvement.

Therefore the need for stimulable phosphors, giving a better signal-to-noise ratio, a higher speed and being stimulable at wavelengths above 600 nm is still there.

OBJECTS AND SUMMARY OF THE INVENTION

It is the object of the present invention to provide a storage phosphor class having a high X-ray absorption, combined with a high intensity of photostimulated emission, thus allowing to build a storage phosphor system for radiography yielding images that have at the same time a high sharpness and a low noise content, through a decreased level of X-ray quantum noise and a decreased level of fluorescence noise.

It is a further object of the invention to provide a storage phosphor class having a high X-ray absorption, combined with a high intensity of photostimulated emission, and showing said high intensity of photostimulated emission when stimulated with light having a wavelength above 600 nm.

It is a further object of the invention to provide a photostimulable phosphor that can be used in panels for medical diagnosis, whereby the dose of X-ray administered to the patient can be lowered and the image quality of the diagnostic image enhanced.

It is another object of the present invention to provide an X-ray screen or panel containing said photostimulable phosphor dispersed in a binder layer.

It is a further object of the present invention to provide a method of recording and reproducing a pattern of penetrating radiation by means of a panel including said phosphor in dispersed form thereby yielding on photostimulation with light in the wavelength range above 600 nm images with very high signal-to-noise ratio.

Other objects and advantages of the present invention will become clear from the following description.

In accordance with the present invention a photostimulable phosphor is provided which is within the scope of the following formula (I):

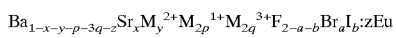

wherein:

$M^{1+}$ is at least one alkali metal selected from the group consisting of Li, Na, K, Rb and Cs;

$M^{2+}$ is at least one divalent metal selected from the group consisting of Ca Mg and Pb;

$M^{3+}$ is at least one trivalent metal selected from the group consisting of Al, Ga, In, Tl, Sb, Bi, Y or a trivalent lanthanide, e.g. La, Ce, Pr, Nd, Sm, Gd, Tb, Dy, Ho, Er, Tm, Yb and Lu;

$0 \leq x \leq 0.30$, $0 \leq y \leq 0.10$, $0 \leq p \leq 0.3$, $0 \leq q \leq 0.1$, $0.05 \leq a \leq 0.76$, $0.20 \leq b \leq 0.90$, $a+b<1.00$ and $10^{-6} \leq z \leq 0.2$.

In a preferred embodiment $0.06 \leq x \leq 0.20$ and $0.85 \leq a+b \leq 0.96$.

In a further preferred embodiment, $0.06 \leq x \leq 0.20$, $0.85 \leq a+b \leq 0.96$, $M^{1+}$ is Cs or Rb, $M^{2+}$ is Pb, $10^{-4} \leq y \leq 10^{-3}$, $10^{-4} \leq p \leq 10^{-1}$ and $q=0$.

DETAILED DESCRIPTION OF THE INVENTION

Figure 1:
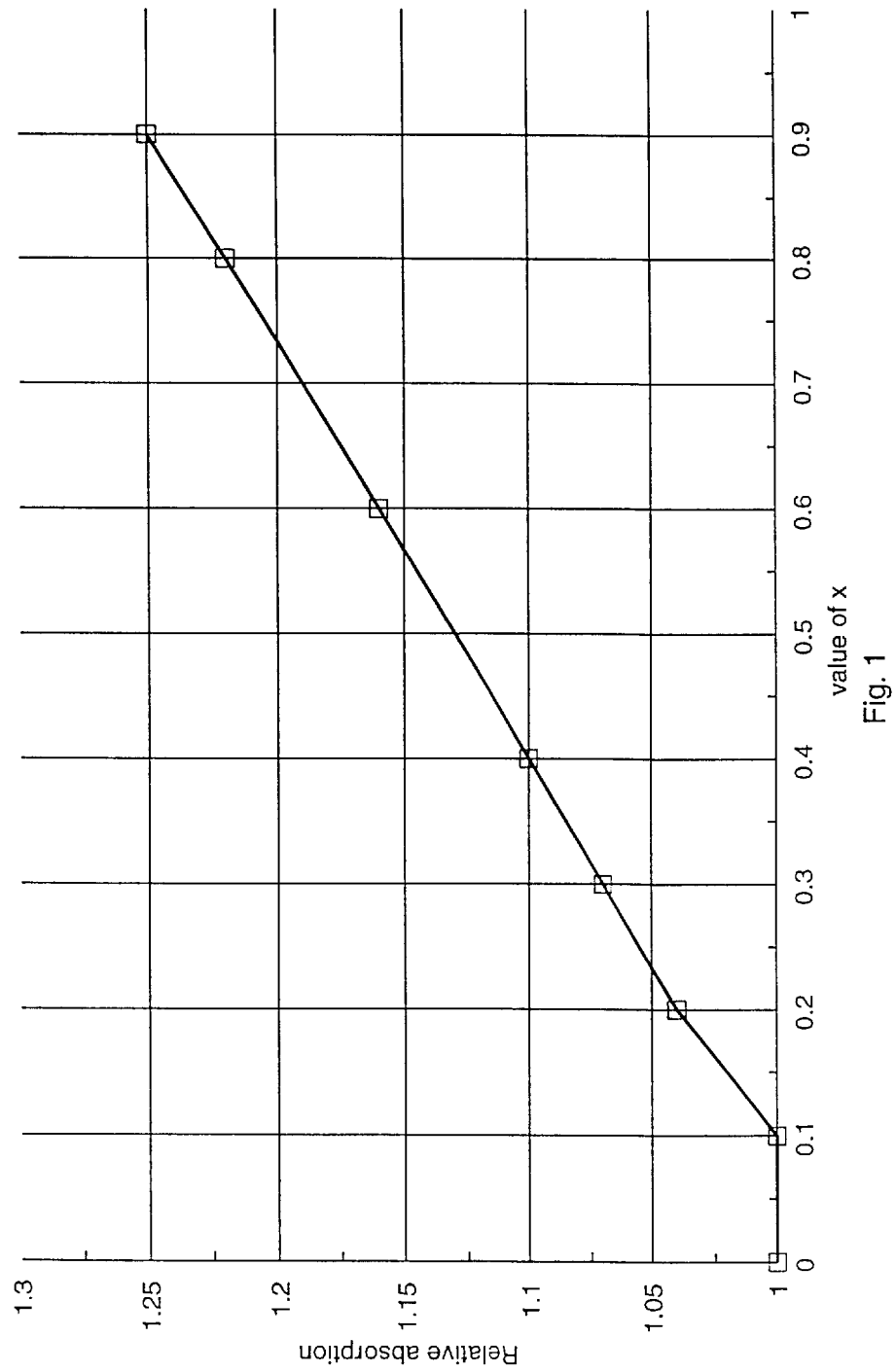
FIG. 1 shows the relative X-ray absorption of a bariumfluorohalide phosphor as a function of the iodine content.

It was found that in a photostimulable phosphor according to formula (I), wherein the molar amount of fluorine present in the phosphor is higher than the combined molar amounts of bromine and iodine, the bromine could be replaced by iodine even in amounts up to 90% before an unacceptable loss of luminance after stimulation is observed. Due to the fact that the luminance does not decrease when the bromine is replaced for around 50% with iodine, as is taught in FIG. 3 of EP-A 142 734, it is possible to enhance the X-ray absorption of phosphors according to the present invention further by further replacing bromine by iodine, since the absorption of X-ray is linearly enhanced by increasing the iodine content. E.g. when the relative absorption of a phosphor with, e.g., 40% of the bromine replaced by iodine is taken 1, then the absorption a phosphor with, e.g. 80% of the bromine replaced by iodine is 1.11, and in the invention phosphor the luminance of a phosphor, wherein 80% of the bromine is replaced by iodine, is 20% higher than that of a phosphor wherein 50% of the bromine has been replaced.

Thus a stimulable phosphor according to the present invention, wherein 80% of the bromine is replaced by iodine, will show a speed that is about 30% higher than the speed of a phosphor wherein only 40% of the bromine is replaced by iodine. This means that with photostimulable phosphors according to the present invention the speed of a photostimulable panel comprising said phosphor can better be "tailor made", i.e. adjusted and adapted to the signal-to-noise ratio necessary in the different medical applications than with prior art phosphors.

The present invention encompasses thus photostimulable phosphors according to formula (I):

$$Ba_{1-x-y-p-3q-z}Sr_xM_y^{2+}M_{2p}^{1+}M_{2q}^{3+}F_{2-a-b}Br_aI_b:zEu$$

wherein:

$M^{1+}$ is at least one alkali metal selected from the group consisting of Li, Na, K, Rb and Cs;

$M^{2+}$ is at least one divalent metal selected from the group consisting of Ca Mg and Pb;

$M^{3+}$ is at least one trivalent metal selected from the group consisting of Al, Ga, In, Tl, Sb, Bi, Y or a trivalent lanthanide, e.g. La, Ce, Pr, Nd, Sm, Gd, Tb, Dy, Ho, Er, Tm, Yb and Lu;

$0 \leq x \leq 0.30$, $0 \leq y \leq 0.10$, $0 \leq p \leq 0.3$, $0 \leq q \leq 0.1$, $0.05 \leq a \leq 0.76$, $0.20 \leq b \leq 0.90$, $a+b<1.00$ and $10^{-6} \leq z \leq 0.2$.

It was found that the beneficial effect of replacing bromine by at least 20 molar % of iodine was even more pronounced when in formula (I) $0.06 \leq x \leq 0.20$ and $0.85 \leq a+b \leq 0.96$.

Very useful phosphors from the viewpoint of speed, noise, signal-to-noise ratio and degrees of freedom in designing photostimulable panel to the needs of the different medical applications, corresponds to formula (I) wherein, $0.06 \leq x \leq 0.20$, $0.85 \leq a+b \leq 0.96$, $M^{1+}$ is Cs or Rb, $M^{2+}$ is Pb, $10^{-4} \leq y \leq 10^{-3}$, $10^{-4} \leq p \leq 10^{-1}$ and q=0.

In the most preferred embodiment a phosphor, according to the present invention corresponds to formula (I) wherein, $0.06 \leq x \leq 0.20$, $0.85 \leq a+b \leq 0.96$, $0.3 \leq b \leq 0.8$, $M^{1+}$ is Cs or Rb, $M^{2+}$ is Pb, $10^{-4} \leq y \leq 10^{-3}$, $10^{-4} \leq p \leq 10^{-1}$ and q=0.

Phosphors according to the present invention can be produced according to any way known in the art, starting from phosphor precursors that are to be incorporated in the phosphor. These phosphor precursors are mixed in the appropriate stoechiometric proportions and are then heated for a given time. After cooling, the sintered block of phosphor is milled into fine phosphor particles. The milling operation continues until a phosphor powder with the appropriate average particle size and size distribution is obtained. Optionally the milled phosphor powder can be classified in separate fractions with a specific particle size distribution. During the preparation of the phosphor any known flux materials can be added to the reaction mixture. Flux materials useful for use in the preparation of the phosphors according to the invention are, e.g., halides, metasilicates of alkali metals or alkaline earth metals. Most preferred are fluxes comprising halides of the alkali metals or alkaline earth metals that are already present in the raw mix. A very useful and preferred method for the preparation of stimulable phosphors according to the present invention can be found in Research Disclosure Volume 358, February 1994 p 93 item 35841, that is incorporated herein by reference.

An other useful method for preparation of stimulable phosphors according to this invention can be found in U.S. Pat. No. 5,154,360.

In essence any known method for preparing X-ray phosphors comprises the steps of:

(i) mixing phosphor precursor materials to form a "raw mix", (ii) grinding said "raw mix" to increase the surface area, (iii) firing said ground "raw mix" at a high temperature in one or multiple stage to allow the precursors to react and form the phosphor which is present as a sintered lump, (iv) desagglomerating said sintered lump of phosphor in a mortar-mill, (v) grinding said desagglomerated lump of phosphor to form fine phosphor particles and classifying said fine phosphor particles in an air classifier.

The phosphor particles for use in the method according to the present invention, are preferably classified. This classification, ensures that the size distribution of the phosphor particles comprises at most 20% by weight, preferably at most 10% by weight, of particles with a diameter lower than 1 μm. The absence of small phosphor particles (phosphor particles with diameter ≦1 μm) had a beneficial effect on the image quality.

For use in the method according to the present invention the phosphor can present in dispersed form in a binder layer that may be supported or self-supporting and forms a screen or panel.

The binder layer incorporates said phosphor in dispersed form preferably in (a) film forming organic polymer(s), e.g. a cellulose acetate butyrate, polyalkyl (meth)acrylates, e.g. polymethyl methacrylate, a polyvinyl-n-butyral e.g. as described in the U.S. Pat. No. 3,043,710, a copoly(vinyl acetate/vinyl chloride) and a copoly(acrylonitrile/butadiene/styrene) or a copoly(vinyl chloride/vinyl acetate/vinyl alcohol) or mixture thereof.

When a binder is used, it is most preferred to use a minimum amount of binder. The weight ratio of phosphor to binder preferably from 80:20 to 99:1. The ratio by volume of phosphor to binding medium is preferably more than 85/15.

Preferably the binding medium substantially consists of one or more hydrogenated styrene-diene block copolymers, having a saturated rubber block, as rubbery and/or elastomeric polymers as disclosed in WO 94/00531. Particularly suitable thermoplastic rubbers, used as block-copolymeric binders in phosphor screens in accordance with this invention are the KRATON-G rubbers, KRATON being a trade mark name from SHELL.

The coverage of the phosphor is preferably in the range from about 5 and 250 mg/cm², most preferably between 20 and 175 mg/cm².

The stimulable phosphor used according to the present invention is preferably protected against the influence of moisture by adhering thereto chemically or physically a hydrophobic or hydrophobizing substance. Suitable substances for said purpose are described e.g. in U.S. Pat. No. 4,138,361.

According to a preferred embodiment the phosphor layer is used as a supported layer on a support sheet. Suitable support materials are made of a film forming organic resin, e.g. polyethylene terephthalate, but paper supports and cardboard supports optionally coated with a resin layer such as an alpha-olefinic resin layer are also particularly useful. Further are mentioned glass supports and metal supports. The thickness of the phosphor layer is preferably in the range of 0.05 mm to 0.5 mm.

When the phosphor according to the present invention is used in combination with a binder to prepare a screen or a panel, the phosphor particles are intimately dispersed in a solution of the binder and then coated on the support and dried. The coating of the present phosphor binder layer may proceed according to any usual technique, e.g. by spraying, dip-coating or doctor blade coating. After coating, the solvent(s) of the coating mixture is (are) removed by evaporation, e.g. by drying in a hot (60° C.) air current.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per $cm^3$ of dry coating).

Optionally, a light-reflecting layer is provided between the phosphor-containing layer and its support to enhance the output of light emitted by photostimulation. Such a light-reflecting layer may contain white pigment particles dispersed in a binder, e.g. titanium dioxide particles, or it may be made of a vapour-deposited metal layer, e.g. an aluminium layer, or it may be a coloured pigment layer absorbing stimulating radiation but reflecting the emitted light as described e.g. in U.S. Pat. No. 4,380,702.

In order to improve resolution it is possible to provide underneath the phosphor layer a layer absorbing the emitted light e.g. a layer containing carbon black or to use a coloured support e.g. a grey or black film support.

For stimulating the stimulable phosphor, any laser or light emitting diode, emitting light within the wavelength range between 700 and 900 nm, (e.g. He—Ne laser, Krypton laser, diode lasers, GaAlAs-laser, dye lasers, etc.) can be used.

The invention is illustrated by the examples and comparative examples given below, without however restricting the invention thereto.

EXAMPLES

1. PREPARATION OF THE STIMULABLE PHOSPHORS

All stimulable phosphor samples have been prepared in the following way:

The phosphor precursors forming a raw mix, in proportions chosen as to yield a particular phosphor, were collected in a PE container, and the mix was homogenised for 15 min on a jar rolling mill. Next, the powder mix was transferred to a rotating blade mixer (Henschel—Germany) and milled for 5 min at 2,000 rpm under Ar atmosphere.

Three crucibles containing 130 g of the mix each, were placed in a quartz tube. The quartz tube was sealed with a flange with a water lock at the gas outlet side.

The sealed quartz tube was placed in an oven at 850° C., and the temperature was kept constant at this temperature during the three hour firing. During the firing the tube was flushed with Ar at a rate of 1.5 l/min.

After the firing, the tube was taken out of the furnace and allowed to cool.

After the cooling, the flange was removed and the three crucibles were taken out of the tube.

The powder was milled and homogenised.

A second firing was performed at 750° C., for 6 hours, under a 1.5 l/min 99.8% $N_2$/0.2% $H_2$ gas flow rate.

Finally, the powder was deagglomerated with a pestle and mortar.

The proportions of the phosphor precursors are given under the headings of the specific examples.

2. MEASUREMENTS

2.1. MEASUREMENT A: Phosphor composition.

Since the cations do not evaporate during the firing, the Ba, Sr, Ca, Cs, Pb and Eu contents of the phosphors were not measured, and it was assumed that the cation ratios were equal to those in the raw mix.

The halides being in excess over the non-evaporating cations, when using ammonium halides as reactants, evaporate partly during the firing.

The F- and Br-content of the phosphors was determined via ion-chromatography.

Measuring equipment and conditions:
ion chromatograph: gic analyser
detector: conductivity detector
guard column a: AG 3
separator column: AS 3
injection volume: 50 µl
detector sensitivity: 100 µs/1000 mV full scale
eluence: 2.8 mM $NaHCO_3$: 2.2 mM $Na_2CO_3$
eluence flow rate: 2.0 ml/min
regenerant: 0.025N $H_2SO_4$
regenerant flow rate: 3.0 ml/min
reference time F: 1.65 min
Determination of $F^-$ The concentration of the fluoride ions ($F^-$) was determined from the height of the F-peak.

To determine the accuracy of the measuring procedure five 1 ppm NaF standards were prepared: 0.5525 g NaF p.a. (pro analysis quality) was weighed and transferred into a 250 ml volumetric flask. The NaF was dissolved in doubly distilled water and water was added to get a total volume of 250 ml. The solution was first diluted 10-fold with doubly distilled water and then further diluted 100-fold. The five 1 ppm NaF standards were injected and the peak height was measured. The average peak height was 385,068 in arbitrary values and the standard deviation was 914.299. This gave a coefficient of variability (standard deviation divided by the average value) of 0.00237.

To measure the F-concentration in the phosphor samples, 50 mg of each sample was transferred into a test tube and 1 ml of analytically pure HCl (1N) was added followed by the addition of about 10 ml of doubly-distilled water. The tube was then sealed and heated for 5 to 10 min in a boiling water bath. The tube was then cooled in ice and 1 ml of NaOH (1N) was injected. The solution was then poured into a 50 ml volumetric flask and the solution made up to 50 ml with doubly distilled water. Finally, the solution was diluted 50-fold with eluence and injected into the ion-chromatograph.

The correctness of the results obtained with the measuring procedure was tested by applying it three times to a pure $BaF_2$ standard, that theoretically contains 21.7% F. The dilution factor was 100 instead of 50. The average percentage F measured on the pure $BaF_2$ standard was 21.73 with a standard deviation of 0.115. This gave a coefficient of variability (standard deviation divided by the average value) of 0.0053.

The reproducibility of the F-concentration measurement, in a phosphor, was determined by performing the measurement in 5-fold for a standard phosphor. The average percentage F measured on the standard phosphor was 8.14 with a standard deviation of 0.288. This gave a coefficient of variability (standard deviation divided by the average value) of 0.0354.

Determination of $Br^{31}$

The concentration of the fluoride ions ($Br^-$) was determined from the height of the Br-peak.

To determine the accuracy of the measuring procedure for determining the bromide ion content five 5 ppm NaBr standards were prepared as follows:

0.3219 g NaBr p.a. (pro analysis quality) was weighed and transferred into a 250 ml volumetric flask. The NaBr was dissolved in doubly distilled water and diluted up to a total volume of 250 ml. The 1000 ppm solutions were diluted 200-fold with double distilled water and then injected into the ion-chromatograph. The peak height was measured. The average peak height was 200,709 in arbitrary values and the standard deviation was 669.106. This gave a coefficient of variability (standard deviation divided by the average value) of 0.00333.

The reproducibility of the results obtained with the described procedure was determined by performing the measurement 5-fold for a standard phosphor. The average percentage Br measured on the standard phosphor was 32.076 with a standard deviation of 0.180. This gave a coefficient of variability (standard deviation divided by the average value) of 0.0056.

The I-content was determined via XRF (X-ray diffraction).

2.2. MEASUREMENT B: the total photostimulable energy stored upon exposure to given X-ray dose Prior to X-ray excitation any residual energy still present in the phosphor screen is removed by irradiation with a halogen lamp of 500 W. The phosphor screen is then excited with an X-ray source operating at 85 kVp and 20 mA. For that purpose the NANOPHOS X-ray source of Siemens AG-W Germany was used. The low energy X-rays are filtered out with a 21 mm thick aluminium plate to harden the X-ray spectrum. After X-ray excitation the phosphor screen is transferred in the dark to the measurement set-up. In this set-up laser light is used to photostimulate the X-ray irradiated phosphor screen. The laser used in this measurement is a He—Ne laser (Spectra Physics). With this laser an optical power of 12 mW is available on 632 nm.

The laser-optics comprise an electronic shutter, a beam-expander and a filter. A photomultiplier (Hamamatsu R 1398) collects the light emitted by the photostimulation and gives a corresponding electrical current. The measurement procedure is controlled by a Hewlett Packard Basic Controller 382 connected to a HP 6944 multiprogrammer. After amplification with a current to voltage convertor a TEKTRONIX TDS420 digital oscilloscope visualises the photocurrent obtained. When the electronic shutter is opened the laser beam begins to stimulate the phosphor screen and the digital oscilloscope is triggered. Using a diaphragm placed in contact with the screen the light emitted by only 7 mm$^2$ is collected. Only half the laser power (6 mW) reaches the screen surface. In this way the intensity of the stimulating beam is more uniform.

The signal amplitude from the photomultiplier is linear with the intensity of the photostimulating light and with the stored photostimulable energy. The signal decreases with a power law. When the signal curve is entered the oscilloscope is triggered a second time to measure the offset which is defined as the component of error that is constant and independent of inputs. After subtracting this offset the point at which the signal reaches 1/e of the maximum value is calculated. The integral below the curve is then calculated from the start to this 1/e point. The function is described mathematically by $f(t) = A \cdot e^{-t/\tau}$: wherein A is the amplitude, $\tau$ is the time constant, t is stimulation time, and e is the base number of natural logarithms.

The 1/e point is reached when $\tau = t$ at which 63% of the stored energy has been released. To obtain said result, the computer multiplies the integral with the sensitivity of the system. The sensitivity of the photomultiplier and amplifier have therefore to be measured as a function of anode-cathode voltage of the photomultiplier and the convolution of the emission spectrum of the phosphor and the transmission spectrum of the separating filter has to be calculated. Because the emission light is scattered in all directions only a fraction of the emitted light is detected by the photomultiplier. The position of the panel and photomultiplier are such that 10% of the total emission is detected by the photomultiplier. After all these corrections have been made a conversion efficiency value (C.E.) is obtained in pJ/mm$^3$/mR. This value varies with screen thickness and therefore for measurements to be comparable they have to be carried out at constant phosphor coverage.

The stimulation energy (S.E.) is defined as the energy necessary to stimulate 63% of the stored energy and is expressed in $\mu J/mm^2$.

From the values C.E. and S.E. a figure of merit (F.O.M.) that is a value describing the sensitivity of the phosphor for practical use. F.O.M.=1000×C.E/S.E.

2.3. Property C: X-ray absorption of the phosphors

The absorption of the different phosphors was calculated as the "Photo-electric and Compton absorption coefficient", $(\mu/\rho)_a$ for a monochromatic X-ray exposure of 40 keV. As basis for the calculations was used: "Storm, E., H. J. Israel: "Photon Cross Sections from 0.001–100 MeV for Elements 1–100". Report LA3753—Los Alamos Scientific Laboratory of the University of California, Nov. 1967". BaFBr was chosen as reference and the absorption was calculated for $Ba_{0.90}Sr_{0.10}F_{1.10}Br_{0.90-x}I_x$.

The results follow in table 1 and FIG. 1, wherein the relative absorption as a function of the iodine content is shown.

TABLE 1

| Value of x | $(\mu/\rho)_a$ (cm$^2$/g) | $(\mu/\rho)_{a,rel}$ |
|---|---|---|
| ref. | 16.5 | 1.00 |
| 0.10 | 16.5 | 1.00 |
| 0.20 | 17.1 | 1.04 |
| 0.30 | 17.7 | 1.07 |
| 0.40 | 18.2 | 1.10 |
| 0.60 | 19.2 | 1.16 |
| 0.80 | 20.1 | 1.22 |
| 0.90 | 20.6 | 1.25 |

PREPARATION OF THE REFERENCE PHOSPHOR (RP)

A raw mix was prepared with the following composition:
BaF$_2$: 0.8557 mol
SrF$_2$: 0.14 mol
PbF$_2$: 0.0003 mol
CsI: 0.003 mol
NH$_4$Br: 0.95 mol
EuF$_3$: 0.001 mol.

After the preparation procedure described above, a phosphor sample was obtained, and its composition was determined according to measurement A.

The reference phosphor corresponded to the formula:

$Ba_{0.8557}Sr_{0.14}Eu_{0.001}Pb_{0.0003}Cs_{0.003}F_{1.10}Br_{0.90}$ (RP)

PREPARATION OF PHOSPHORS ACCORDING TO THE INVENTION (IP)

Seven raw mixes as described above for the reference phosphor, were prepared except for the presence of amount of BaI$_2$ and the proportionate diminishing of the amount of NH$_4$Br. NH$_4$Br was replaced by BaI$_2$ in the following proportion: 0.5 mole of BaI$_2$ replaced 1 mole of NH$_4$Br. At the same time the amount of BaF$_2$ was diminished in such a way that the Ba/Sr ratio was the same for all seven raw mixes.

The amount of BaI$_2$ present in the raw mix for the different invention phosphors (IP1 to IP 7) is given in table 2.

TABLE 2

| Invention Phosphor # | Amount of BaI$_2$ in mol |
|---|---|
| IP1 | 0.075 |
| IP2 | 0.12 |
| IP3 | 0.165 |
| IP4 | 0.25 |
| IP5 | 0.30 |
| IP6 | 0.35 |
| IP7 | 0.45 |

After the preparation procedure described above, seven phosphor samples were obtained, and their composition was determined according to measurement A.

The seven invention phosphors corresponded to the formulas:

$Ba_{0.8557}Sr_{0.14}Eu_{0.001}Pb_{0.0003}Cs_{0.003}F_{1.10}Br_{0.75}I_{0.15}$ (IP1)

$Ba_{0.8557}Sr_{0.14}Eu_{0.001}Pb_{0.0003}Cs_{0.003}F_{1.10}Br_{0.66}I_{0.24}$ (IP2)

$Ba_{0.8557}Sr_{0.14}Eu_{0.001}Pb_{0.0003}Cs_{0.003}F_{1.10}Br_{0.57}I_{0.33}$ (IP3)

$Ba_{0.8557}Sr_{0.14}Eu_{0.001}Pb_{0.0003}Cs_{0.003}F_{1.10}Br_{0.40}I_{0.50}$ (IP4)

$Ba_{0.8557}Sr_{0.14}Eu_{0.001}Pb_{0.0003}Cs_{0.003}F_{1.10}Br_{0.30}I_{0.60}$ (IP5)

$Ba_{0.8557}Sr_{0.14}Eu_{0.001}Pb_{0.0003}Cs_{0.003}F_{1.10}Br_{0.20}I_{0.70}$ (IP6)

$Ba_{0.8557}Sr_{0.14}Eu_{0.001}Pb_{0.0003}Cs_{0.003}F_{1.10}Br_{0.10}I_{0.80}$ (IP7)

The seven phosphor powders were dispersed in a binder solution containing cellulose acetobutyrate dissolved in methyl ethyl ketone. The dispersions obtained were coated onto a 100 μm thick transparent sheet of polyethylene terephthalate to give a dry coating weight of about 1,000 g/m$^2$.

The conversion efficiency (C.E.) and stimulation energy (S.E.) for the panels comprising the reference phosphor (RP) and the invention phosphors (IP1 to IP 7) were measured under stimulation with a He—Ne laser emitting at 632 nm (Measurement B). From the values C.E. and S.E. a figure of merit (F.O.M.) that is a value describing the sensitivity of the phosphor for practical use was calculated: F.O.M.=1000× C.E/S.E.

Figure 2:
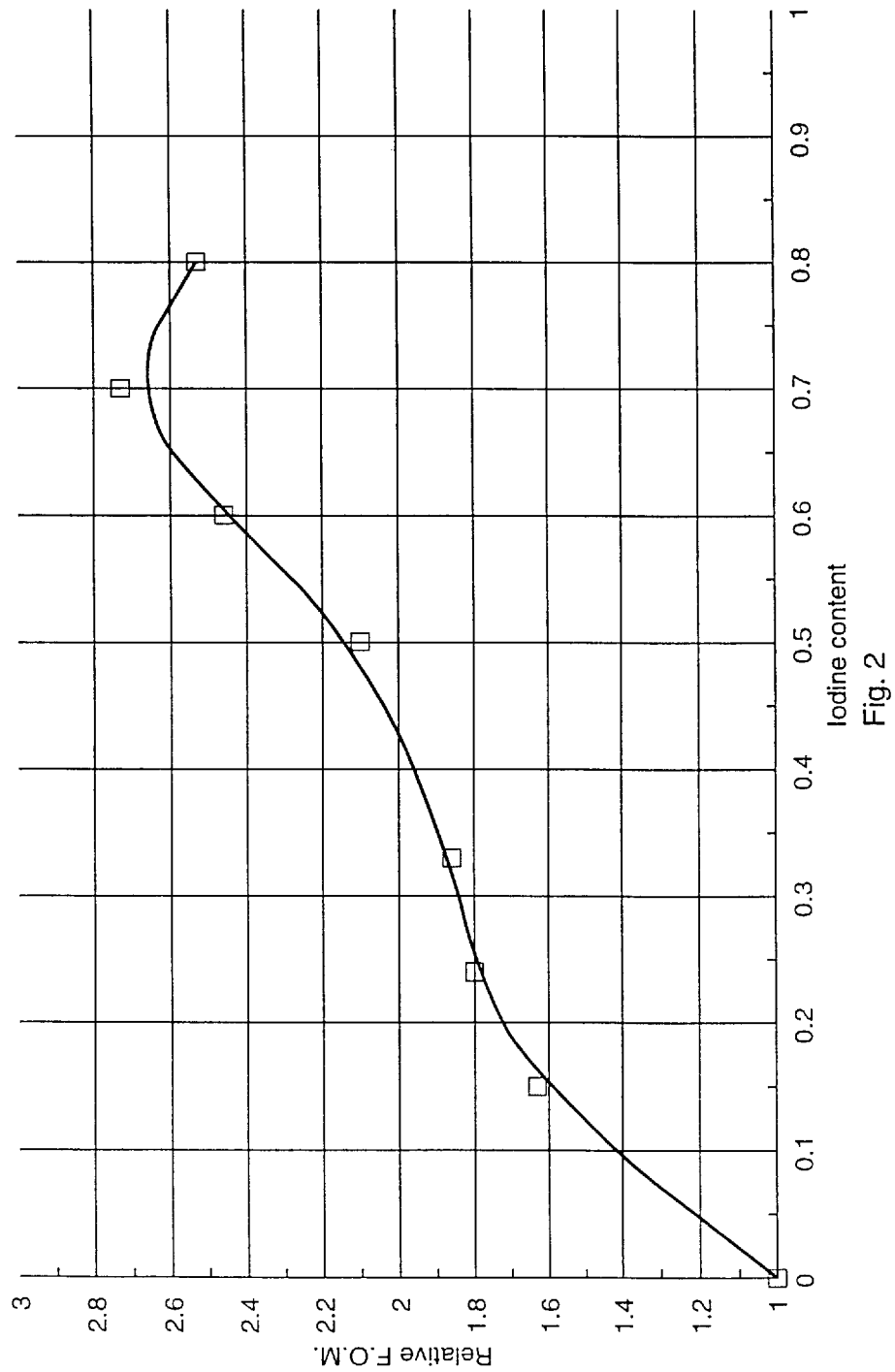
FIG. 2 shows the relative F.O.M. (figure of merit) of bariumfluorohalide phosphors according to this invention as a function of the iodine content.

The values of the F.O.M. and the relative values are given in table 3. The relative values are also represented in FIG. 2 as a function of the iodine content.

TABLE 3

| Phosphor # | Iodine content | F.O.M | Relative F.O.M. |
|---|---|---|---|
| RP | 0 | 4,530 | 1 |
| IP1 | 0.15 | 7,390 | 1.63 |
| IP2 | 0.24 | 8,130 | 1.80 |
| IP3 | 0.33 | 8,450 | 1.86 |
| IP4 | 0.50 | 9,500 | 2.10 |
| IP5 | 0.60 | 11,125 | 2.46 |
| IP6 | 0.70 | 12.380 | 2.73 |
| IP7 | 0.80 | 11,380 | 2.53 |

We claim:

1. A radiation image recording and reproducing method comprising the steps of:

i. causing a radiation image storage panel containing a photostimulable phosphor to absorb radiation having passed through an object or having been radiated from an object, ii. exposing said image storage panel to stimulating rays to release the radiation energy stored therein as light emission, the stimulating rays being electromagnetic waves having a wavelength within the range of 600–900 nm iii. detecting the emitted light, wherein said photostimulable phosphor corresponds to formula (I):

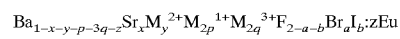

$Ba_{1-x-y-p-3q-z}Sr_xM_y^{2+}M_{2p}^{1+}M_{2q}^{3+}F_{2-a-b}Br_aI_b$:zEu wherein:

M$^{1+}$ is at least one alkali metal selected from the group consisting of Li, Na, K, Rb and Cs;

M$^{2+}$ is at least one divalent metal selected from the group consisting of Ca Mg and Pb;

M$^{3+}$ is at least one trivalent metal selected from the group consisting of Al, Ga, In, Tl, Sb, Bi, Y, La, Ce, Pr, Nd, Sm, Gd, Tb, Dy, Ho, Er, Tm, Yb and Lu;

$0 \leq x \leq 0.30$, $0 \leq y \leq 0.10$, $0 \leq p \leq 0.3$, $0 \leq q \leq 0.1$, $0.05 \leq a \leq 0.76$, $0.20 \leq b \leq 0.90$, $a+b<1.00$ and $10^{-6} \leq z \leq 0.2$.

2. The radiation image recording and reproducing method of claim 1 wherein $0.06 \leq x \leq 0.20$, $0<p \leq 0.3$ and $0.85 \leq a+b \leq 0.96$.

3. The radiation image recording and reproducing method of claim 1 wherein M$^{1+}$ is Cs or Rb, M$^{2+}$ is Pb, $10^{-5} \leq y \leq 10^{-3}$, $10^{-4} \leq p \leq 10^{-1}$ and q=0.

4. The radiation image recording and reproducing method of claim 1 wherein $0.30 \leq b \leq 0.80$.

* * * * *